United States Patent [19]
Brown et al.

[11] 3,902,389
[45] Sept. 2, 1975

[54] TURRET PUNCH PRESS WITH WORK FEED

[75] Inventors: Paul R. Brown, Akron; James A. McElwain, Niagara Falls, both of N.Y.

[73] Assignee: Houdaille Industries, Inc., Buffalo, N.Y.

[22] Filed: Aug. 27, 1974

[21] Appl. No.: 500,843

[52] U.S. Cl. .................. 83/71; 83/140; 83/277; 83/282; 83/387; 83/454; 83/552; 83/588
[51] Int. Cl. ......... B26d 7/02; B26d 7/06; B26f 1/04
[58] Field of Search ....... 83/277, 282, 140, 71, 387, 83/383, 454, 552, 588

[56] References Cited
UNITED STATES PATENTS

| | | | |
|---|---|---|---|
| 2,353,405 | 7/1944 | King | 83/277 X |
| 3,393,594 | 7/1968 | Wallis | 83/277 X |
| 3,448,645 | 6/1969 | Graf et al | 83/277 X |
| 3,449,991 | 6/1969 | Daniels | 83/277 X |

Primary Examiner—Frank T. Yost
Attorney, Agent, or Firm—Hill, Gross, Simpson, Van Santen, Steadman, Chiara & Simpson

[57] ABSTRACT

A punch press of the turret type is provided which includes automatically controlled means for moving the workpiece in the X and Y axes and for controlling press operation. The press includes a pair of power-driven lock means aligned with two of the punching stations remote from the punching axis for partially actuating the tooling therein to clamp the workpiece therebetween without altering its configuration, thereby enabling the clamps which hold the workpiece during movement to be released and reclamped at a predetermined distance from the place of first clamping.

2 Claims, 5 Drawing Figures

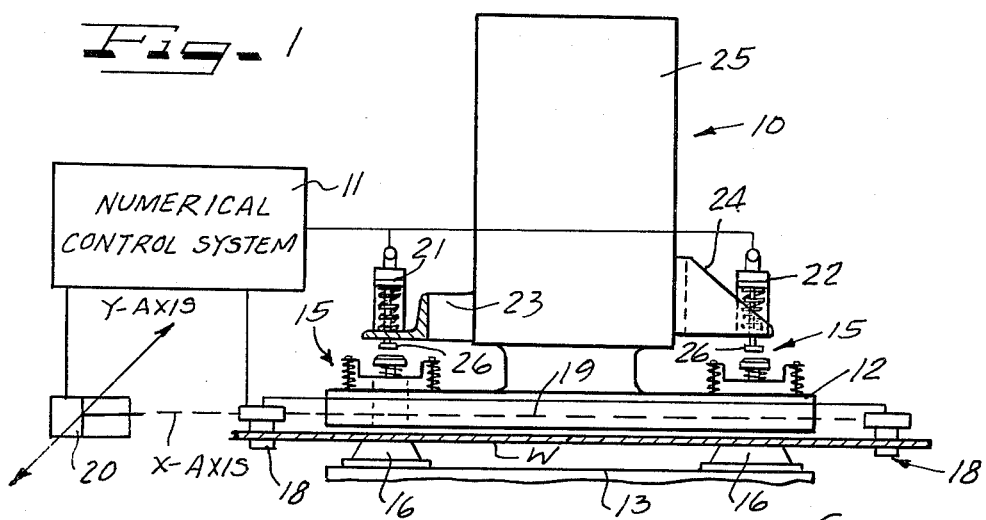
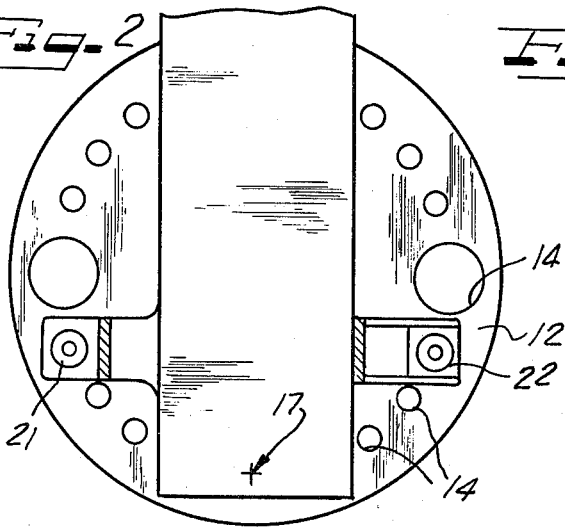
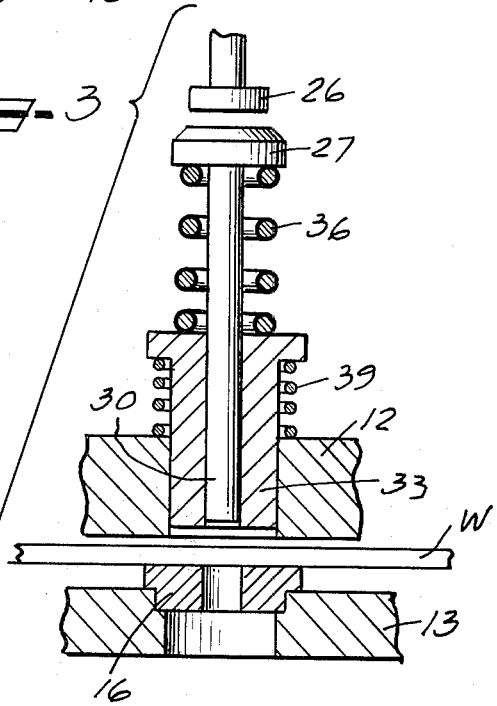
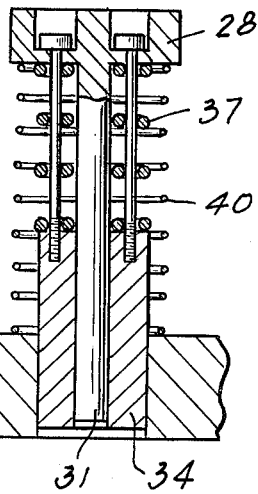
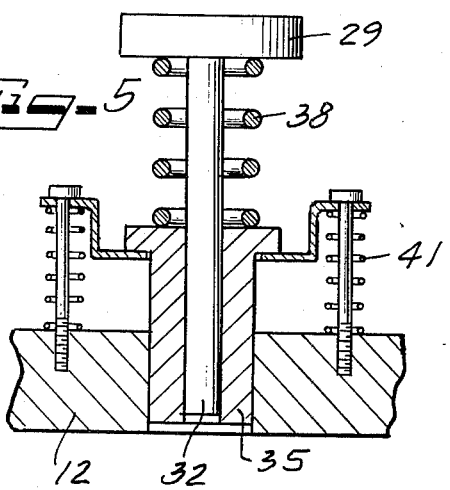

TURRET PUNCH PRESS WITH WORK FEED

BACKGROUND OF THE INVENTION

1. Field of the Invention

This invention relates to punch presses, and more specifically to a turret press which has a workpiece positioning system for shifting a workpiece about in the X and Y axes.

2. Prior Art

U.S. Pat. No. 3,349,658 discloses a workpiece positioning system which includes a lock mechanism for rigidly locking the workpiece in a fixed position while the workpiece positioning system releases its hold on the workpiece and moves alone for a programed distance to regrasp the workpiece to enable punching thereof at previously inaccessible points, all without loss of dimensional references. In that system, two actuators are utilized which have a rather long stroke and which coact with the workpiece support table to provide the clamping. The workpiece support table of necessity must be either rigid or reinforced to provide a firm reaction to such actuator-type of locks. Further, special steps were taken, such as use of urethane pads on the actuators, to insure parallelism for eliminating any likelihood of workpiece movement or distortion during such clamping. Further, such type of lock means or actuators could not be readily adapted for use in a turret press because of the inherent configuration of a turret punch press. Further, the brackets that mounted such lock mechanism also had to be very rugged to provide the necessary rigidity needed in the support of such actuators, as needed to avoid any deflection of the workpiece that might lead to inaccurate manufacture.

SUMMARY OF THE INVENTION

According to the invention, a pair of power-driven lock means such as a pair of pneumatically driven linear actuators are used to partially operate two of the tool sets carried by the turret which are remote from the punching axis, thus using such tooling to effect the clamping needed for a programed change in the point at which the workpiece is grasped.

Accordingly, it is an object of the present invention to provide a system for positioning a workpiece in a punch press of the turret type by which a workpiece may automatically be progressively moved with respect to the positioning system.

A further object of the present invention is to provide, in a turret press, a positioning system for the workpiece which enables access to a portion of the workpiece which normally is beyond the travel range of the positioning system.

Many other advantages, features and additional objects of the present invention will become manifest to those versed in the art upon making reference to the detailed description and the accompanying drawings in which preferred structural embodiments incorporating the principles of the present invention are shown by way of illustrative example.

ON THE DRAWINGS

FIG. 1 is a fragmentary front view, partly diagrammatic, of a turret punch press having a positioning system in accordance with the present invention;

FIG. 2 is a top view of the turret portion of the press; and

FIGS. 3–5 schematically illustrate three known types of tooling that can be used in this invention.

AS SHOWN ON THE DRAWINGS:

The principles of this invention are particularly useful when embodied in a punch press 10 having a numerical control system 11 for operating various controls as more fully disclosed and explained in U.S. Pat. No. 3,349,658, which is incorporated herein by reference. The punch press 10 includes an upper turret 12, a lower turret 13 having aligned tool stations 14 (FIG. 2) in which there is disposed appropriate tooling. In this embodiment, the relatively reciprocable tooling includes a punch and stripper guide assembly 15 disposed in each of a plurality of tool stations 14 in the upper turret 12, and a plurality of dies 16 disposed in corresponding tool stations in the lower turret 13. The turrets 12, 13 are rotated until selected tooling is aligned with the punching axis 17 of the press so that a ram (not shown) can drive the punch and stripper guide assembly 15 downwardly to coact with the die 16 on a workpiece W.

The workpiece W is held by a pair of power-driven clamps 18 which in turn are carried on a support bar diagrammatically indicated by a broken line 19 which in turn is driven in the direction of the X-axis by a power-driven actuator 20 and also in the Y-axis by structure not shown, as is known.

In accordance with the invention, there is provided a pair of power-driven lock means which here comprise pneumatic actuators 21,22 which are carried by a pair of brackets 23,24 on the upper arm or head 25 of the punch press 10. These actuators may be of the single acting spring-return type and each has a piston rod connected to a foot 26. The actuators 21,22 are disposed remotely from the punching axis in line with a pair of stations 14.

In order to fully understand the clamping action which the actuators 21,22 provide through the tooling 15,16, reference is made to tooling shown in each of FIGS. 3–5. In each of these known types of tooling, the head 26 of the actuators 21,22 engages the head 27,28 or 29 of a punch 30,31 or 32 which is slidably guided in a stripper sleeve 33,34 or 35 which is slidably guided in the upper turret 12. A stripping spring 36,37 or 38, or a plurality of such springs acts between the punch head 27,28,29 and the stripping and guiding sleeve 33,34,34 to keep the punch 30,31,32 retracted from the lower end of the stripping sleeve 33,34,35. One or more lifter springs 39,40,41 acts between the upper turret 12 and the stripper sleeve 33 or the punch head 28 or the stripper sleeve 35. The lifter springs 39,40,41 have a comparatively low spring rate and they support the punches, stripping springs and stripping sleeves associated therewith as a unit.

The actuators 21,22 are so sized and are provided with such fluid pressure that the actuator heads 26 can act through the aligned punches and through their stripping springs to urge the stripping sleeve, such as 33,34,35, against the workpiece W with a sufficient force to hold the workpiece in clamped relation with the associated die 16. At the same time, the size of the actuator and the magnitude of the fluid pressure applied thereto is not of sufficient strength as to cause any significant compression of the stripping springs 36,37,38 so that the respective punches 30,31,32 have their lower or cutting ends retracted into the associated stripping sleeve 33,34,35.

The control means 11 for automatically releasing the clamp means 18, for shifting the support bar 19 a controlled distance and regrasping the workpiece W while the actuators 21,22 hold the workpiece W clamped between stripping sleeves 33,34 or 35 and the dies 16, and the operation thereof, as a system, is the same as shown in U.S. Pat. No. 3,349,658.

This invention enables the provision of a progressive move system on a turret press. In using the tooling as clamping elements, advantage is taken of their inherent rigidity and the parallelism between the face of the stripping sleeves 33,34,35 and the dies 16. The brackets 23,24 which support the air cylinders 21,22 are of lighter construction than heretofore because they do not have to extend beyond the limits of the turret 12 to engage the workpiece W. Further, the structure by which the workpiece supporting table (not shown) is held can be less rigid because such table now only supports the workpiece remotely from the turret and thus is not subjected to the clamping force of the clamps of the system shown in U.S. Pat. No. 3,349,658. With this system, the positioning of the power-driven clamps 18,18 is enabled to enable the punch press to produce parts which have a working area that exceeds the normal travel of the machine's X-axis, and also enables the punch press 10 to do punching at a point on the workpiece where one of the work clamps 18,18 was first located. Further, it is now no longer necessary to compensate for possible misalignment between the face of the heads 26 and the associated structure, and therefore the heads 26 can be of wear resistant metal. Any slight yielding of one of the mounting brackets 23,24 has no effect on the workpiece W, thereby eliminating one of the sources of possible error in the prior system.

Although various minor modifications might be suggested by those versed in the art, it should be understood that we wish to embody within the scope of the patent warranted hereon, all such embodiments as reasonably and properly come within the scope of our contribution to the art.

We claim as our invention:

1. A system for positioning a workpiece in a punch press of the turret type, comprising:
   a. a power-driven support bar movable in the X and Y axes and having power-driven clamp means for releasably grasping a marginal portion of the workpiece;
   b. a pair of superposed turrets having coactive relatively reciprocable tooling in at least one of the tool stations thereof;
   c. at least one power-driven lock means disposed in fixed relation in juxtaposition to at least one of said tool stations remote from the punching axis of the press for acting vertically on the movable tooling with sufficient force to clamp the workpiece between the tooling of the upper and lower turrets without altering the workpiece configuration; and
   d. control means for automatically releasing said clamp means, moving said support bar, and reclosing said clamp means while the workpiece is clamped by said lock means.

2. A system for positioning a workpiece in a punch press of the turret type, comprising:
   a. a support bar adapted to be power driven horizontally in the X and Y axes and having power-driven clamp means for releasably grasping a marginal portion of the workpiece;
   b. a pair of superposed turrets having a set of peripheral tool stations, the lower turret having a plurality of dies and the upper turret having a corresponding plurality of punch assemblies, each punch assembly comprising
      1. a sleeve guided in one of the upper turret tool stations;
      2. a punch guided in said sleeve;
      3. a stripping spring acting between the punch and sleeve, and urging the punch in a direction away from the die; and
      4. a lifting spring acting between said upper turret and one of said punch and said sleeve and normally holding said sleeve, said stripping spring and said punch in raised relation to the workpiece;
   c. a pair of actuators disposed in fixed relation in juxtaposition to two of said punch assemblies remote from the punching axis of the press, said actuators each having a power capacity to clamp said workpiece between and by means of said sleeve and its die but insufficient power capacity to force said punch against the workpiece; and
   d. control means for automatically releasing said clamp means, shifting said support bar a controlled distance, and regrasping the workpiece while said actuators hold the workpiece clamped between said sleeves and said dies.

* * * * *